A. H. MERRIMAN.
Punch-Press.
No. 168,763.
Patented Oct. 11, 1875.
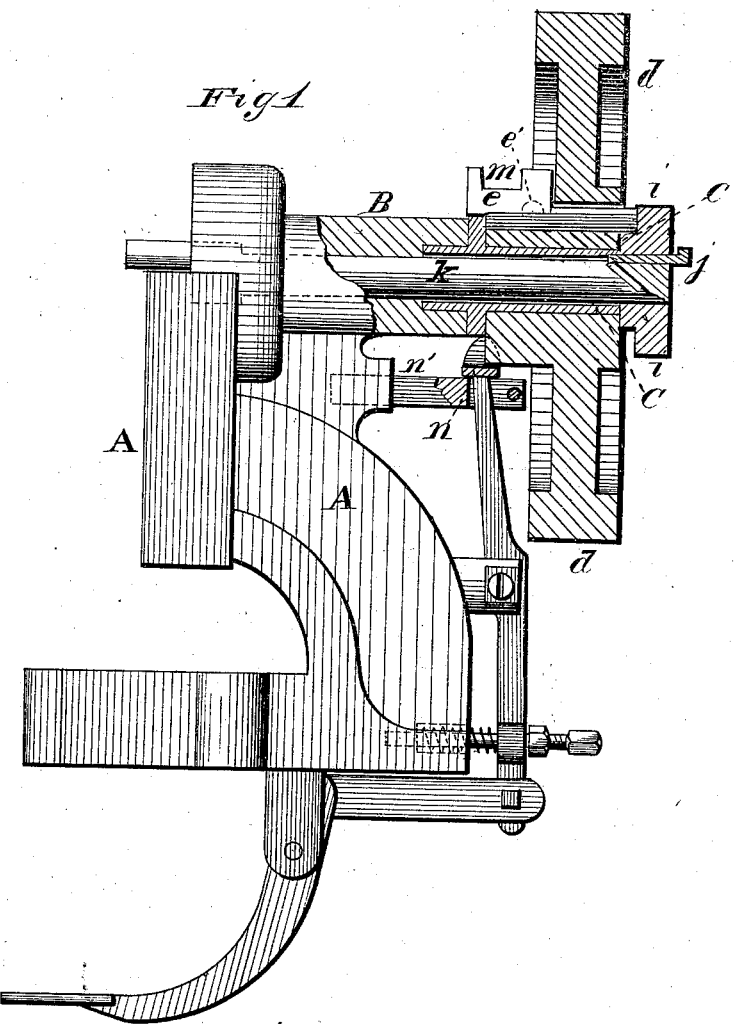
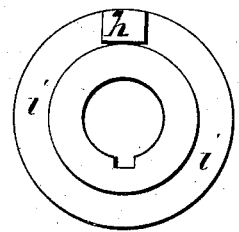
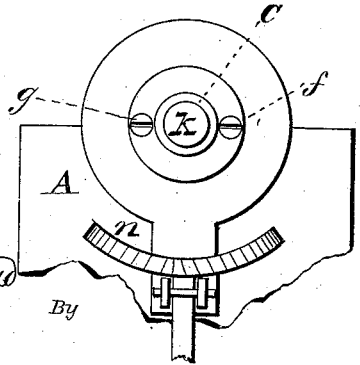
WITNESSES
Franck L. Durand
Philip McNickle
INVENTOR
Alanson H. Merriman
by L. Deane,
Attorney

UNITED STATES PATENT OFFICE.

ALANSON H. MERRIMAN, OF WEST MERIDEN, CONNECTICUT.

IMPROVEMENT IN PUNCH-PRESSES.

Specification forming part of Letters Patent No. 168,763, dated October 11, 1875; application filed September 20, 1875.

*To all whom it may concern:*

Be it known that I, ALANSON H. MERRIMAN, of West Meriden, county of New Haven and State of Connecticut, have invented a certain new and useful Improvement in Punch-Press; and to enable others skilled in the art to make and use the same I will proceed to describe it, referring to the drawings, in which the same letters indicate like parts in each of the figures.

The nature of this improvement consists in arranging a balance-wheel to revolve upon a stationary bearing formed on the horn of a press, independent of its operating shaft, the object of which is to entirely remove friction, occasioned by the movement or revolution of the wheel, from the operating mechanism of the press.

In the accompanying drawing, Figure 1 is a side view, partly in section. Fig. 2 is an end view, with the balance-wheel off. Fig. 3 is a detail.

A is the frame-work of a press. B is that part of a press which I call a horn, upon which is formed a bearing for the balance-wheel to revolve upon, and through which the operating-shaft $k$ takes its bearing and revolves. This sleeve or bearing C is fitted into the back end of the horn B of the press, and is secured thereto by screws $g$ passing through a flange, $f$, into the end of the horn. There are various ways of producing this bearing C for the balance-wheel to revolve upon. A bushing may be inserted through the whole length of the horn, and extended through the back end sufficient to receive the balance-wheel and the clutch-collar $i$. $k$ is an operating shaft, which is fitted into the horn through the bearing C, so as to receive the clutch-collar $i$, made and secured thereon in the common way, by screw or key $j$. $d$ is a balance-wheel. $e$ is a clutch-bolt, fitted into the hub of the balance-wheel $d$ in the common way, held stationary and prevented from moving in either direction by means of a friction-spring within the hub, held and regulated by a screw, $e'$, except when acted upon by any of the change motions or shoe device $n$, working in the opening $m$. This shoe $n$ is secured upon the end of a spring-lever, (similar to that shown in my patent of June 22, 1875,) which plays in a slit in the arm $n'$, extending back from the press.

By the use of this improvement I am enabled entirely to avoid the difficulties frequently experienced in all presses with which I am acquainted, as the friction of the wheel upon the operating-shaft usually is so great as to carry the wrist-pin past its upper center, when the clutch is released. Sometimes the wheel's friction is so great as to render it necessary, in order to overcome it, to compress or tighten up the gibs, which endangers the cutting or grinding in the ways, and tends to check the momentum of the balance-wheel.

By this improvement the difficulty is entirely removed; as will be seen, when the clutch is disengaged the shaft instantly ceases to revolve. Thus, the parts only require that degree of adjustment to cause them to fit closely and play freely together.

This improvement is equally applicable to all machines where similar difficulties are experienced. This stationary bearing enables me to use any kind of composition or metals therefor, other than cast-iron.

What I claim, and desire to secure by Letters Patent, is—

A stationary bearing upon the horn of a press, substantially as and for the purpose set forth.

ALANSON H. MERRIMAN. [L. S.]

Witnesses:
FRANK S. FAY,
CHAS. H. SHAW.